US012145784B2

(12) United States Patent
Goodrich

(10) Patent No.: US 12,145,784 B2
(45) Date of Patent: Nov. 19, 2024

(54) EXTENSIBLE PAPER AND ITS USE IN THE PRODUCTION OF EXPANDED SLIT PACKAGING WRAP AND VOID FILL PRODUCTS

(71) Applicant: David P. Goodrich, Sedona, AZ (US)

(72) Inventor: David P. Goodrich, Sedona, AZ (US)

(73) Assignee: HexcelPack, LLC, Sedona, AZ (US)

( * ) Notice: Subject to any disclaimer, the term of this patent is extended or adjusted under 35 U.S.C. 154(b) by 0 days.

(21) Appl. No.: 18/220,396

(22) Filed: Jul. 11, 2023

(65) Prior Publication Data

US 2023/0348160 A1 Nov. 2, 2023

Related U.S. Application Data

(63) Continuation of application No. 17/844,031, filed on Jun. 19, 2022, now Pat. No. 11,760,548, which is a (Continued)

(51) Int. Cl.
*B65D 65/22* (2006.01)
*B31D 3/02* (2006.01)
(Continued)

(52) U.S. Cl.
CPC ........... *B65D 65/22* (2013.01); *B31D 3/0207* (2013.01); *B31D 3/0292* (2013.01); *B31D 3/04* (2013.01); *B31D 5/006* (2013.01); *B31D 5/0065* (2013.01); *B31D 5/0069* (2013.01); *B65D 81/03* (2013.01); *B65D 85/672* (2013.01); *D21H 5/24* (2013.01); *D21H 5/245* (2013.01); *D21H 27/10* (2013.01);
(Continued)

(58) Field of Classification Search
None
See application file for complete search history.

(56) References Cited

U.S. PATENT DOCUMENTS 1,999,282 A 4/1935 Clemens
2,996,425 A 8/1961 Hamilton
(Continued)

FOREIGN PATENT DOCUMENTS

CA 2251477 A1 10/1997
CH 337723 A 4/1959
(Continued)

OTHER PUBLICATIONS

Van Eperen, Roger, The effect of testing procedures on tensile strength and tear resistance of shipping bag kraft paper, Sep. 2004 (date available) (Year:2004). Cited in Parent U.S. Appl. No. 17/844,031 on Sep. 12, 2022.

(Continued)

*Primary Examiner* — Jeffrey A Vonch
(74) *Attorney, Agent, or Firm* — Studebaker Brackett PC

(57) ABSTRACT

An extensible slit sheet paper product is produced having an expandable slit pattern that forms open cells upon expansion of the paper product. The paper product is an extensible paper having an extensibility in the range from 1-9% in the machine direction and 1-5% in the cross direction. The expansion produces an array of hexagonal cells. The expanded extensible paper can be used to wrap an object for shipping by wrapping and cushioning the object in the expanded slit sheet material. The extensible, expandable slit sheet paper can be wrapped around itself to produce a void fill product.

28 Claims, 6 Drawing Sheets

Related U.S. Application Data continuation of application No. 16/872,813, filed on May 12, 2020, now Pat. No. 11,383,906, which is a continuation of application No. 16/018,702, filed on Jun. 26, 2018, now Pat. No. 10,669,086.

(60) Provisional application No. 62/524,905, filed on Jun. 26, 2017.

(51) Int. Cl.

| | |
|---|---|
| ***B31D 3/04*** | (2006.01) |
| ***B31D 5/00*** | (2017.01) |
| ***B65D 81/03*** | (2006.01) |
| ***B65D 85/672*** | (2006.01) |
| ***D21H 25/00*** | (2006.01) |
| ***D21H 27/00*** | (2006.01) |
| ***D21H 27/10*** | (2006.01) |
| *B31D 1/00* | (2017.01) |
| *B32B 3/12* | (2006.01) |
| *B32B 3/24* | (2006.01) |
| *B65B 55/20* | (2006.01) |

(52) U.S. Cl.

CPC .... *B31D 1/0031* (2013.01); *B31D 2205/0023* (2013.01); *B65B 55/20* (2013.01); *D21H 25/005* (2013.01); *Y10T 428/24298* (2015.01); *Y10T 428/24306* (2015.01); *Y10T 428/24314* (2015.01)

(56) References Cited

U.S. PATENT DOCUMENTS

| | | | |
|---|---|---|---|
| 3,104,197 | A | 9/1963 | Back et al. |
| 3,220,116 | A | 11/1965 | Freuler |
| 3,266,972 | A | 8/1966 | Cramer et al. |
| 3,269,393 | A | 8/1966 | Ackermann |
| 3,329,562 | A | 7/1967 | Schaefer |
| 3,357,172 | A | 12/1967 | Evans |
| 3,523,865 | A | 8/1970 | Ihrman |
| 3,908,071 | A | 9/1975 | Heim et al. |
| 4,040,899 | A | 8/1977 | Emerson |
| 4,230,036 | A | 10/1980 | Groome |
| 4,832,228 | A | 5/1989 | Hickey |
| 5,365,819 | A | 11/1994 | Maida et al. |
| 5,538,778 | A | 7/1996 | Hurwitz et al. |
| 5,544,473 | A | 8/1996 | Maida et al. |
| 5,667,135 | A | 9/1997 | Schaefer |
| 5,667,871 | A | 9/1997 | Goodrich et al. |
| 5,688,578 | A | 11/1997 | Goodrich |
| 5,782,735 | A | 7/1998 | Goodrich et al. |
| 6,024,832 | A | 2/2000 | Trani et al. |
| 6,117,062 | A | 9/2000 | Alhamad |
| 6,416,623 | B1 | 7/2002 | Hollmark et al. |
| 6,458,447 | B1 | 10/2002 | Cabell et al. |
| 6,712,930 | B2 | 3/2004 | Koivukunnas |
| 7,918,966 | B2 | 4/2011 | Trani et al. |
| 8,518,522 | B2 | 8/2013 | Trani et al. |
| 9,945,077 | B2 | 4/2018 | Hashiguchi et al. |
| 2002/0060034 | A1 | 5/2002 | Hollmark et al. |
| 2004/0056080 | A1 | 3/2004 | Johansson et al. |
| 2004/0076798 | A1 | 4/2004 | Larsson et al. |
| 2007/0240841 | A1 | 10/2007 | Trani et al. |
| 2010/0196633 | A1 | 8/2010 | Kuchar |
| 2012/0248177 | A1 | 10/2012 | Beaulieu et al. |
| 2012/0266568 | A1 | 10/2012 | Prud'homme et al. |
| 2014/0166661 | A1 | 6/2014 | Goodrich |
| 2014/0329049 | A1 | 11/2014 | Zhang |
| 2015/0122866 | A1 | 5/2015 | Kuchar et al. |
| 2015/0140265 | A1 | 5/2015 | Page et al. |
| 2015/0151895 | A1 | 6/2015 | Zhang |
| 2015/0176303 | A1 | 6/2015 | Kuchar et al. |
| 2016/0067938 | A1 | 3/2016 | Goodrich |
| 2016/0355985 | A1 | 12/2016 | Hashiguchi et al. |
| 2017/0203866 | A1 | 7/2017 | Goodrich |
| 2017/0267018 | A1 | 9/2017 | Tepe et al. |
| 2017/0313017 | A1 | 11/2017 | Cheich et al. |
| 2017/0341845 | A1 | 11/2017 | Mulvey et al. |
| 2018/0079161 | A1 | 3/2018 | Cheich |
| 2018/0229910 | A1 | 8/2018 | Kohn et al. |
| 2019/0100369 | A1 | 4/2019 | Hoffman et al. |
| 2021/0101356 | A1 | 4/2021 | Cheich et al. |

FOREIGN PATENT DOCUMENTS

| | | | |
|---|---|---|---|
| CN | 1134687 | A | 10/1996 |
| CN | 201990066 | U | 9/2011 |
| CN | 202244644 | U | 5/2012 |
| CN | 102733266 | A | 10/2012 |
| DE | 4340531 | A1 | 6/1994 |
| GB | 951132 | A | 3/1964 |
| GB | 1534342 | A | 12/1978 |
| JP | S36-4149 | B | 4/1961 |
| JP | S50-065388 | A | 6/1975 |
| JP | S50-098194 | U | 8/1975 |
| JP | H01-226574 | A | 9/1989 |
| JP | H04-050647 | U | 4/1992 |
| JP | 1993286023 | A | 11/1993 |
| JP | H06-320647 | A | 11/1994 |
| JP | H07-502718 | A | 3/1995 |
| JP | H08-119334 | A | 5/1996 |
| JP | H09-328170 | A | 12/1997 |
| JP | H10-297676 | A | 11/1998 |
| JP | 3091247 | B2 | 9/2000 |
| JP | 2001277380 | A | 10/2001 |
| JP | 2004017408 | A | 1/2004 |
| JP | 2005047149 | A | 2/2005 |
| JP | 2005-178834 | A | 7/2005 |
| JP | 2006-248538 | A | 9/2006 |
| JP | 2006-290356 | A | 10/2006 |
| JP | 2009-102031 | A | 5/2009 |
| JP | 3165722 | U | 2/2011 |
| JP | 2015-017336 | A | 1/2015 |
| JP | 2017-193376 | A | 10/2017 |
| WO | 1984/002936 | A1 | 8/1984 |
| WO | 9318911 | A1 | 9/1993 |
| WO | 9601731 | A1 | 1/1996 |
| WO | 9624540 | A1 | 8/1996 |
| WO | 0126889 | A1 | 4/2001 |
| WO | 2010101232 | A1 | 9/2010 |
| WO | 2015/035335 | A1 | 3/2015 |
| WO | 2019005739 | A1 | 1/2019 |

OTHER PUBLICATIONS

Dumbleton, David P., Longitudinal compression of individual pulp fibers, Mar. 2005 (date available) (Year: 2005). Cited in Parent U.S. Appl. No. 17/844,031 on Sep. 12, 2022.

Vishtal et al., Boosting the Extensibility Potential of Fibre Networks: a Review, 2014, BioResources, vol. 9, No. 4 (Year: 2014). Cited in Parent U.S. Appl. No. 17/844,031 on Sep. 12, 2022.

R.S. Seth Pulp & Paper Canada T31, 106:2 (2005) III, pp. 33-40 (T31-T38). Cited in Parent U.S. Appl. No. 17/844,031 on Sep. 12, 2022.

International Search Report and Written Opinion in Related PCT Application No. PCT/2018/39416, dated Nov. 20, 2018. Cited in Parent U.S. Appl. No. 17/844,031, filed Sep. 12, 2022.

International Search Report dated Nov. 20, 2018, issued in Application No. PCT/US18/39416 (counterpart to US Application No. PCT/US2018/039416: (5 pages). Cited in Parent U.S. Appl. No. 17/844,031, filed Sep. 12, 2022.

International Search Report dated Oct. 25, 1995, issued in counterpart GB Application No. PCT/GB95/01578 (2 pages). Cited in Parent U.S. Appl. No. 17/844,031, filed Sep. 12, 2022.

International Search Report dated Jul. 2, 1993, issued in counterpart Application No. PCT/US93/02369 (3 pages). Cited in Parent U.S. Appl. No. 17/844,031, filed Sep. 12, 2022.

International Search Report dated Jun. 6, 1996, issued in counterpart Application No. PCT/US96/01743 (4 pages). Cited in Parent U.S. Appl. No. 17/844,031, filed Sep. 12, 2022.

(56) References Cited

OTHER PUBLICATIONS

Diaz, "Clupak Paper—a New Type of High-Stretch Paper-Its Manufacture and Performance," 1959, ASTM International in Symposium on Paper and Paper Products—New Developments with Accompanying Requirements for New Testing Methods (Year : 1959) Cited in Parent U.S. Appl. No. 17/844,031 on Sep. 12, 2022.
Extended Search Report dated Feb. 25, 2021, issued in counterpart EP Application No. 19764975.9 (7 pages). Cited in Parent U.S. Appl. No. 17/844,031, filed Sep. 12, 2022.
Office Action dated Oct. 21, 2020, issued in counterpart AU Application No. 2018290739 (4 pages). Cited in Parent U.S. Appl. No. 17/844,031, filed Sep. 12, 2022.
Office Action dated Mar. 2, 2021, issued in counterpart JP Application No. 2020-520433, with English translation (22 pages). Cited in Parent U.S. Appl. No. 17/844,031, filed Sep. 12, 2022.
English Translation of Office Action dated Apr. 2, 2021, issued in counterpart CN Application No. 201880054670.8. (11 pages) Cited in Parent U.S. Appl. No. 17/844,031, filed Sep. 12, 2022.
Office Action dated Mar. 26, 2021, issued in counterpart CA Application No. 3,067,852. (4 pages) Cited in Parent U.S. Appl. No. 17/844,031, filed Sep. 12, 2022.
Office Action dated Jul. 22, 2021, issued in counterpart IN Application No. 202017001425, with English Translation. (7 pages) Cited in Parent U.S. Appl. No. 17/844,031, filed Sep. 12, 2022.
Office Action dated Oct. 12, 2021, issued in counterpart JP Application No. 2020-520433, with English Translation. (17 pages) Cited in Parent U.S. Appl. No. 17/844,031, filed Sep. 12, 2022.
Office Action dated Dec. 23, 2021, issued in counterpart EP application No. 18 822 784.7. (5 pages). Cited in Parent U.S. Appl. No. 17/844,031, filed Sep. 12, 2022.
An Office Action mailed by China National Intellectual Property Administration on Mar. 17, 2022, which corresponds to Chinese Patent Application No. 201880054670.8 and is related to U.S. Appl. No. 17/844,031; with English language translation (no newly cited references). Cited in Parent U.S. Appl. No. 17/844,031, filed Sep. 12, 2022.
An Office Action mailed by the Korean Intellectual Property Office on Mar. 30, 2022, which corresponds to Korean Patent Application No. 10-2021-7039059 and is related to U.S. Appl. No. 17/844,031; with English language translation (no newly cited references). Cited in Parent U.S. Appl. No. 17/844,031, filed Sep. 12, 2022.
Office Action issued in ID P00202000625; mailed by the Indonesian Directorate General of Intellectual Property on Aug. 13, 2021. Cited in Parent U.S. Appl. No. 17/844,031, filed Sep. 12, 2022.
C.B. Ihrman and O.E. Ohm. "Extensible Paper by the Double-Roll Compacting Process." Trans. of the IIIrd Fund Res. Symp. Cambridge, pp. 410-434 (1965). Cited in Parent U.S. Appl. No. 17/844,031, filed Nov. 6, 2022.
H.L. Hamrick. "Understanding the Growth in Production and Use of 'Clupak' Extensible Paper." IPPTA Seminar, pp. 126-130 (1978). Cited in Parent U.S. Appl. No. 17/844,031, filed Nov. 6, 2022.
Office Action issued by the Japanese Patent Office on Jun. 21, 2022 in Japanese Patent Application 2021-140755, which is related to U.S. Appl. No. 17/844,031. Cited in Parent U.S. Appl. No. 17/844,031, filed Nov. 10, 2022.
Office Action dated May 30, 2023 in corresponding divisional Japanese Patent Application 2023-008664 (with English Translation), which divisional Japanese Patent Application is a divisional from issued Japanese Patent Nos. 7217786 and 7153720). Cited in Parent U.S. Appl. No. 17/844,031, filed Jun. 14, 2023.
A Hearing Notice issued by the Indian Patent Office on Dec. 21, 2023, which corresponds to Indian Patent Application No. 202017001425 and is related to U.S. Appl. No. 18/220,396.
Invalidity contentions filed in *HexcelPack, LLC* v. *Pregis LLC*, Case No. 23-cv-15282, Northern District of Illinois regarding related U.S. Pat. Nos. 10,669,086, 11,383,906 and 11,760,548 (Feb. 22, 2024).

EXTENSIBLE PAPER AND ITS USE IN THE PRODUCTION OF EXPANDED SLIT PACKAGING WRAP AND VOID FILL PRODUCTS

BACKGROUND

Cross Reference to Related Applications

This application is a continuation of copending U.S. application Ser. No. 17/844,031, filed Jun. 19, 2022, which is a continuation of U.S. application Ser. No. 16/872,813, now U.S. Pat. No. 11,383,906, filed May 12, 2020, which is a continuation of U.S. application Ser. No. 16/018,702, filed on Jun. 26, 2018, now U.S. Pat. No. 10,669,086, which claims the benefit of U.S. Provisional Application 62/524,905 filed Jun. 26, 2017, entitled Extensible Paper and Its Use to Produce Expanded Slit Paper, the entire disclosures of which applications are all incorporated herein by reference.

FIELD OF THE INVENTION

This invention relates to expanded slit sheet paper that is employed in packaging wrap applications and the like.

DESCRIPTION OF THE BACKGROUND ART

The prior expanded slit sheet paper was non-extensible and was primarily made from Kraft paper. The prior expanded slit sheet paper was expanded using manual or powered expansion systems. See: U.S. Pat. Nos. 5,538,778, 5,667,871, 5,688,578, and 5,782,735, and PCT/US2014/054615, the entire disclosures of which are incorporated herein by reference as though recited herein in full.

For decades, the prior expanded slit sheet paper persisted in the marketplace despite limitations of the existing technology without any contemplation of the present invention or the potential advantages therefrom.

SUMMARY OF THE INVENTION

The preferred embodiments overcome problems in the above and/or other background art.

Another notable object of some preferred embodiments of the present invention is to create a lightweight expanded slit sheet made from paper for the use as void fill.

A notable object of some preferred embodiments present invention is to overcome the shortcomings of the prior art. In accordance with a broad embodiment of the invention, an expanded slit sheet paper is made with an extensible paper that, e.g., advantageously substantially reduces a pulling force necessary to expand the expanded slit sheet material. Among other benefits, this reduced pulling force leads to a variety of very substantial benefits, including that it avoids previously required complex resistant devices that were previously necessary and opens the market to smaller manual expansion devices that can be made to be almost completely recyclable.

In accordance with a broad embodiment of the invention, the use of extensible paper reduces the pulling force necessary to stretch the expanded slit sheet material and thereby expands the market to include, e.g., void fill usage and lighter weight papers for greater cushioning effect for very fragile items.

In accordance with another embodiment of the invention, the use of extensible paper reduces the tendency of the slit paper to tear during the expanding of the expandable slit sheet paper without negating the ability to tear the expanded slit sheet paper from the roll of expandable slit sheet paper at the end of the wrapping step.

In accordance with another embodiment of the present invention an extensible slit sheet paper product is produced having a slit pattern that forms open cells upon expansion of the paper product. The paper product is an extensible paper having an extensibility in the range from 1-9% in the machine direction and 1-5% in the cross direction. Preferably the extensible paper has an extensible range from 1-6% in the machine direction and 1-4% in the cross direction. Most preferably the extensible paper has an extensible range from 1-4% in the machine direction and 1-3% in the cross direction.

In accordance with another embodiment of the present invention an extensible slit sheet paper product is produced having a slit pattern that forms open cells upon expansion of said paper product, wherein said slit sheet is expandable by applying an expansion force in the range from 0.15 to 0.22 pounds per inch, to form at least one expanded sheet having an array of hexagonal cells and where the extensible paper has an extensible range from 1-6% in the machine direction and 1-4% in the cross direction.

In accordance with further embodiment of the present invention a shipping package comprises a wrapped object, where the wrapped object is wrapped in at least two layers of an expanded slit paper wrap having interlocking hexagonal cells. The slit sheet is expanded by applying an expansion force in the range from 0.15 to 0.22 pounds per inch, to form the at least two layers of expanded slit paper wrap having interlocking hexagonal cells. The slit paper wrap is formed from an extensible paper having an extensible range from 1-9% in the machine direction and 1-5% in the cross direction. The wrapped object is contained within a shipping container that is preferably formed from corrugated paper board. Preferably the extensible paper has an extensible range from 1-6% in the machine direction and 1-4% in the cross direction. Most preferably the extensible paper has an extensible range from 1-4% in the machine direction and 1-3% in the cross direction. Preferably, the slit sheet is characterized by being expandable by applying an expansion force in the range from 0.15 to 0.22 pounds per inch, to form at least one expanded sheet having an array of hexagonal cells.

In accordance with a still further embodiment of the present invention a method is provided for expanding a slit sheet material that upon expansion, forms two or more layers of interlocking hexagonal cells, wherein the slit sheet material is an extensible paper having an extensible range from 1-9% in the machine direction and 1-5% in the cross direction. The slit sheet material is expanded and wrapped to form adjacent layers that are in interlocking contact. A feature of the wrapped layers is that they resist contraction and nesting of cells. Preferably the extensible paper has an extensible range from 1-6% in the machine direction and 1-4% in the cross direction. Most preferably the extensible paper has an extensible range from 1-4% in the machine direction and 1-3% in the cross direction. Preferably, the slit sheet is characterized by being expandable by applying an expansion force in the range from 0.15 to 0.22 pounds per inch, to form at least one expanded sheet having an array of hexagonal cells. The wrapping of the slit sheet material preferably comprises wrapping the expanded slit sheet around an object and forming at least two layers of overlying interlocking hexagonal cells layers around the object. Preferably, the overlying interlocking hexagonal cells are in direct contact substantially across the width of the layers.

In accordance with a still another embodiment of the present invention, the invention comprises protecting an object for shipping by wrapping and cushioning the object in an expanded slit sheet material. The expanded slit sheet material is at least one sheet of expandable sheet material of a flexible, non-woven fibrous material, having a plurality of spaced parallel rows of individual slits in a slit pattern extending transversely from one end of the fibrous sheet material to the opposing end of said at least one sheet, each of said rows having interval spaces between consecutive slits. The slits in each row are positioned adjacent the interval space between consecutive slits in the adjacent parallel row of slits, such that upon expansion, three dimensional hexagonal cells are formed. The slit sheet material is formed from an extensible paper having an extensible range from 1-9% in the machine direction and 1-5% in the cross direction. The method comprising the steps of:

a) expanding a length of at least one sheet of an expandable sheet material by applying an expansion force in the range from 0.15 to 0.22 pounds per inch, to form at least one expanded sheet having an array of openings, said flexible, non-woven fibrous sheet material and said slit pattern, in combination producing an expandable sheet characterized by i) forming upon expansion, an array of hexagonal openings, said openings being bound by land areas and leg areas, and being generally similar in shape and size, in a consistent, uniformly repeating pattern, and opening in generally a random pattern extending transversely from one end of the fibrous sheet to the opposing end and also adjacent to the first set of rows non-repeatable traversing from one end to the opposing end of the fibrous sheet material, b) wrapping said at least one expanded sheet around an object, and c) placing the wrapped object in a package.

Preferably the extensible paper has an extensible range from 1-6% in the machine direction and 1-4% in the cross direction. Most preferably the extensible paper has an extensible range from 1-4% in the machine direction and 1-3% in the cross direction.

In accordance with a still further embodiment of the present invention the extensible paper, as designed, stretches as part of an increase in paper strength. The slit sheet only utilizes the extensible property to ease of rotating the cells into the stretched shape. This means that only at the exact point at which the cell rotates (one land area on each side of the slit) does the slit utilize the extensible paper's ability to stretch. The extensible properties are utilized and finished as soon as the cell begins to rotate into its three dimensional shape. After that the slit pattern properties regardless of paper type, opens with greater ease to the point at which three dimensional hexagonal cells are formed. The extensibility of the paper comes into play only at the initial moment of expansion.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are described by a way of example, and not limitation, in relation to the accompanying figures, in which.

DEFINITIONS RELATING TO THE PREFERRED EMBODIMENTS

Figure 1:
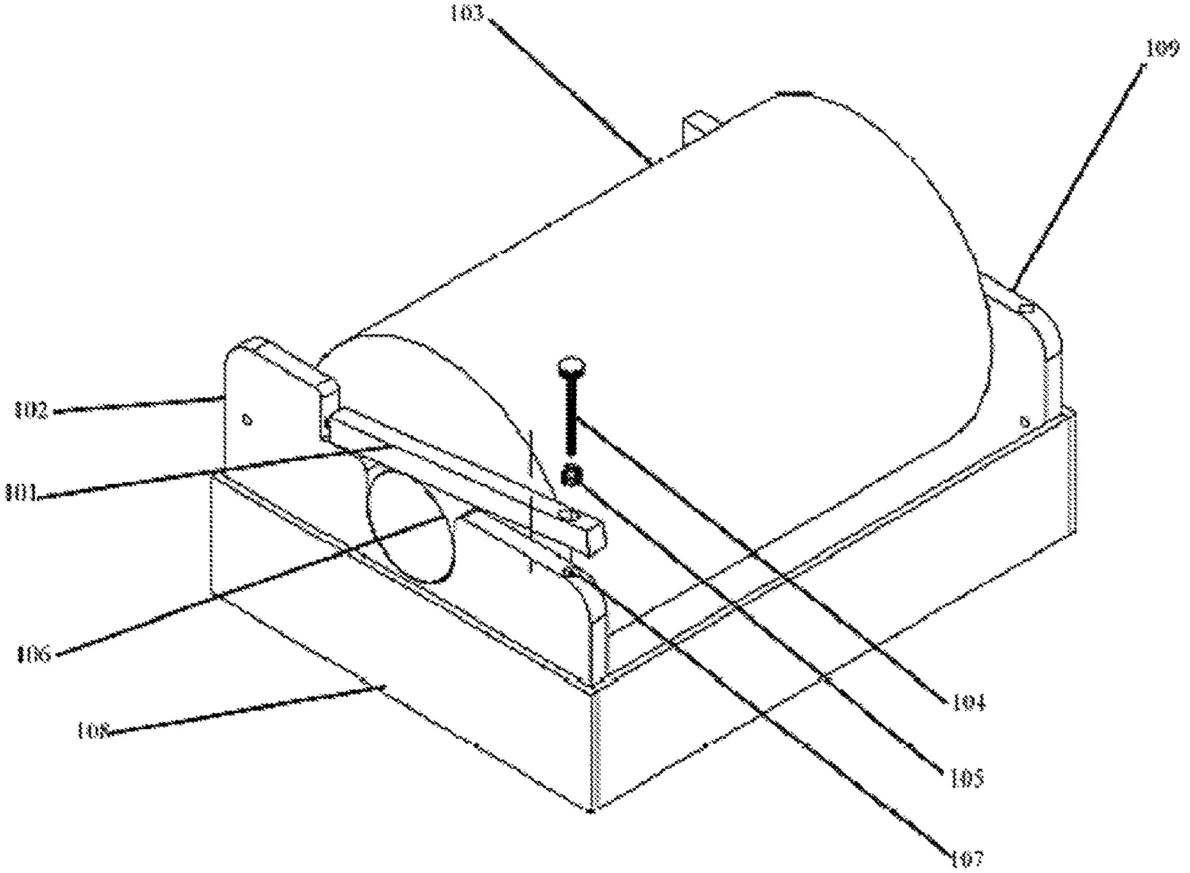
FIG. 1 is a perspective view of an illustrative manual expander in the open and ready to use position.

For the purposes of the present invention, the term "expandable" as applied to paper sheets, means a paper having a slit pattern that enables the paper to be expanded by opening of the slits upon applying a force in a longitudinal direction of the paper sheet. Illustrative expandable paper sheets are disclosed in U.S. Pat. Nos. 5,538,778, 5,667,871, 5,688,578, and 5,782,735, and International Application No. PCT/US2014/054615, the disclosures of which are all incorporated by reference herein in their entireties, as though recited in full. The slit pattern enables the paper to be expanded in length, with a related decrease in width due to the nature of the slit pattern. The slit pattern produces an increase in length due to the slit pattern when processed in an expander as taught in PCT/US2014/054615 pending U.S. application Ser. Nos. 15/001,168, 15/428,144, and 15/820,514, the entire disclosures of which are incorporated by reference herein, as though recited in full.

For the purposes of the present invention, the term "extensible" as applied to paper sheets, means a paper sheet that is able to stretch in a longitudinal direction of the paper sheet upon applying a force in the longitudinal direction of the paper sheet. Illustrative extensible sheets are disclosed in U.S. Pat. No. 3,908,071, U.S. patent application Ser. No. 14/901,977 (U.S. Pat. No. 9,945,077), International Application No. WO 1984002936, U.S. Publication Nos. 2002/0060034, 2007/0240841 (U.S. Pat. No. 7,918,966), and U.S. Pat. Nos. 3,104,197, 3,220,116, 3,266,972, 3,269,393, 3,908,071, 6,024,832, 6,458,447, and 6,712,930, the entire disclosures of which are incorporated by reference herein, as though recited in full. It should be understood that the stretching of an extensible paper must be measured in an unslit sheet of paper. As disclosed in U.S. Pat. No. 3,266,972, the test and characterization procedures employed in measuring elongation (extensibility) properties can be in accordance with standard TAPPI test Elongation T457. In addition, as disclosed in U.S. Pat. No. 3,266,972, the expression "extensible papers" means a paper having an increasable elongation in the machine direction as compared to standard, non-extensible Kraft paper.

The following is a direct quote of the paragraph on column 1, lines 4-19, of U.S. Pat. No. 3,908,071 incorporated by reference in the preceding paragraph: “Extensible (compacted) paper produced, for example, in accordance with the apparatus and process disclosed in U.S. Pat. No. 2,624,245 has certain well recognized advantages and commercial uses. Such paper is subjected, while in a partially moistened condition, to compressive compaction in the direction of web movement (machine direction or MD) between a pressure nip, thus compacting and forcing the fibers together to produce an inherent stretchability without creping. Compacted paper has improved tensile energy absorption (TEA) burst and tear characteristics which are highly desirable for such end uses as the manufacture of paper sacks.” In addition, the following is a direct quote of the Abstract of U.S. Pat. No. 6,024,832 incorporated by reference in the preceding paragraph: “A method for producing extensible paper, comprising the following stages: feeding a mix of vegetable fibres to a kneader member, mixing the mix with water in the kneader, beating the fibres to obtain a pulp, transferring the beaten pulp into a flow chest, feeding the beaten pulp from the flow chest onto a paper web formation cloth with consequent reduction of the water percentage by gravity and vacuum, pressing the web, with consequent further reduction of its water content, initial drying of the paper web to a substantially constant moisture content of between 15% and 65%, compacting, final drying to a moisture content of between 15% and 4%, preferably 10%-8%, glazing, wherein: the beating stage is carried out by rubbing the fibres in a multistage unit to obtain a pulp having a degree of beating of at least 30.degree. SR, the compacting stage is carried out between at least a pair of rollers of which one is of hard material comprising circumferential surface ribs and driven at greater speed, and the other is of soft material with a smooth surface and driven at lesser speed.” In addition, the following is a direct quote of the 2nd paragraph of the Background section of U.S. Pat. No. 9,945,077 incorporated by reference in the preceding paragraph: “On the other hand, Clupak refers to equipment that inserts a paper web between a roll and an endless rubber blanket to compress the paper web with a nip bar and the rubber blanket, while at the same time the pre-stretched blanket shrinks to cause Application No.: NEW 3 the paper web to also shrink and thereby increase its breaking elongation, and this equipment is used to provide increased breaking elongation to kraft paper used in heavy packaging applications as mentioned above.” In addition, the following is a direct quote of the paragraph on column 2, lines 41-56 of U.S. Pat. No. 3,104,197 incorporated by reference in the preceding paragraph: “The use of rubber or rubberous material in conjunction with a hard surface in the manner described is known in the treatment of paper as well as fabrics but only in a general way and the present invention includes the use of rubber considerably softer and more elastic than previously used. Also of great importance in the production of an extensible paper by creping it in this manner is the differential in speeds at which the rolls are driven. If the proper combination of hard and soft surfaces is provided, a semi-dry paper web passing through the nip of the rolls will be carried by the contracting rubber against the direction of web travel toward the nip and over the surface of the hard roll. This creates a uniformly compressed crepe in the paper web giving toughness, pliability and extensibility.”

For the purposes of the present invention the term “extensible slit sheet paper” means a paper that is both extensible and expandable.

DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

The disclosures of U.S. Pat. Nos. 5,538,778, 5,667,871, 5,688,578, and 5,782,735 and U.S. Non-Provisional application Ser. No. 15/428,144 describe expandable slit sheet papers and are all incorporated by reference herein in their entireties, as if recited herein in full as part of the description of the present invention.

A crepe paper type, as found in U.S. Application No. 2002/0060034 (U.S. Pat. No. 6,416,623) teaches the creation of an extensible sheet that is not usable within the present invention. In this case the manufacturing of the slit sheet material is not possible since the crepe paper would easily stretch through the expanded slit sheet manufacturing process. This type of extensible paper is not usable in the present invention because it has too much stretch and creates a distorted expanded slit sheet. The sheet then becomes very narrow as the hexagonal cells stretch to their limit and virtually close.

Pending U.S. Non-Provisional application Ser. No. 15/428,144 describes an expansion device that varies the tension directly to the extended paper core attached to the unexpanded slit sheet material. Surprisingly, the present inventor has discovered as set forth in the present application that substantial benefits are created as a result of using a minor to moderately extensible type paper that provides a stretch to the paper, which, e.g., greatly facilitates and reduces the force required to expand the expanded slit sheet material. Notably, the prior expanded slit sheet paper persisted in the marketplace for decades despite limitations of the existing technology without any contemplation of the present invention or the potential advantages therefrom.

In some preferred embodiments, extensible paper can be produced by varying the accumulation of paper fibers by essentially slowing the paper feeding process during the drying method to trap extra fibers that make the paper appear to have microscopically sized rows of paper that you would see if one were to pleat the paper. The difference is that extensible paper's microscopic rows are adhered to each other through the use of binders and other types of adhesives in conjunction with the drying process. Reference is made to patent U.S. Application No. 2007/0240841 (U.S. Pat. No. 7,918,966) where the purpose is to create a non-creped extensible paper that does not easily disconnect from itself. In addition, the surface of the extensible paper is still fairly flat.

In the preferred embodiments of the present invention, the extensible paper that is employed has low extensible properties as compared to other types of extensible papers. In this regard, an optimal extensible paper enables a smooth transition from an unexpanded to the expanded slit sheet by providing a small amount of stretching at the very start of expansion of the extensible slit sheet paper material.

In some exemplary constructions, during expansion of a slit sheet, the force required to initiate expansion is substantially higher than the force required to continue expansion. For example, once the paper initially starts to bend at the slits, the expansion continues more easily during continued bending at the slits. The force required to continue the expansion of the slit sheet during this continued bending is dramatically reduced beyond the above-noted initial expansion. In some preferred embodiments, the extensible slit sheet paper substantially reduces the force required to initiate expansion. On the other hand, in some preferred embodiments, during the above-noted continued expansion, the extensible paper does not substantially stretch simultaneously with the process of expanding the slit sheet paper; otherwise, the expanded sheet might not optimally be made into a cushioning wrap.

It should be noted that in this application, all theories related to functioning of the invention are provided to facilitate appreciation of concepts of the invention, rather than by way of limitation. Extensible paper, as designed, stretches as part of an increase in paper strength. In some embodiments, the functioning of the invention involves that the extensible slit sheet paper substantially utilizes the extensible property to ease the rotating the cells into the stretched shape and to resist tearing of the slit sheet during the expansion step. This means that at the initial point at which the cell rotates (i.e., initiating rotation between legs 38*a* and 38*b* on each side of the slit and land 20) the extensible slit sheet paper is substantially enhanced by the extensible paper's ability to stretch. In some embodiments, the functioning of the invention, thus, involves that extensible papers' properties are substantially utilized at this initial point and substantially finished as soon as the cell begins to rotate into its three dimensional shape (i.e., after this initial point, the reliance on the extensible nature of the paper may be less substantial or even non-existant). After that initial point, the slit pattern properties, regardless of paper type, opens with greater ease to the point at which it forms a hexagon. Accordingly, in some embodiments, the extensible property substantially merely comes into play at the initial moment of expansion. In some other embodiments, while the extensible features of the paper comes into play most substantially at this initial point of rotation, the extensible features of the paper can have some affect during further expansion of the paper, whereby the initial point of expansion can be substantially facilitated due to extensibility and further expansion can also be, at least, somewhat facilitated due to extensibility.

In some of the preferred embodiments, preferable extensible papers that can be employed include extensible papers where the purpose of the extensible nature is to provide the type of stretching found for the use of multi-wall bags for heavy weight items like cement, or seed and the like. U.S. Patent Publication No. 2016/0355985 (U.S. application Ser. No. 14/901,997) and U.S. Pat. Nos. 3,104,197 and 3,266,972 teach the manufacture and properties of this form of extensible paper. Further teachings can be found in "Understanding sheet extensibility", R. S. Seth, Pulp & Paper Canada T31, 106:2 (2005) III, pages 33-40 (T31-T38). The disclosures of the foregoing patents, patent publication, and printed publication are incorporated herein by reference, as though recited in full.

The following are direct quotes of paragraphs [0003] and [0028] of U.S. Patent Publication No. 2016/0355985 incorporated by reference in the preceding paragraph: (1) "[0003] On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above;" and "[0028] The manufacturing method using this Clupak system is such that a paper web is inserted between a roll and an endless rubber blanket to compress the paper web with a nip bar and the rubber blanket, while at the same time the pre-stretched blanket shrinks to cause the paper web to also shrink and thereby increase its breaking elongation. The Clupak system allows for adjustment of the breaking elongation of kraft paper in the longitudinal direction according to the ratio of the manufacturing speed on the inlet side of the Clupak system and manufacturing speed on the outlet side of the Clupak system, and also according to the pressurization force applied by the nip bar."

The prior expanded slit sheet art (See, e.g., U.S. Pat. Nos. 5,538,778, 5,667,871, 5,688,578, and 5,782,735) focused on paper strength to inhibit tearing during the expansion process and Kraft paper was satisfactory because the strength required coincided with the thickness required to make a satisfactory wrapping product. The increased strength of an expandable sheet does not contribute to or increase the value/performance of the expansion of the slit sheet material. It has now been found by the present inventor that an expandable slit sheet paper can be substantially improved by the use of an extensible sheet. In the preferred embodiments, this use of an extensible slit sheet paper advantageously provides a reduction in force required to open the slit sheet and therefore provides a faster and easier expanding process for the user of the expanded slit sheet. The unexpected benefit resulting from the reduction in force at the very start of the expansion of the slit sheet provides an unexpected improvement to the slit sheet packaging product and renders the employment of the extensible paper highly unique. Notably, the prior expanded slit sheet paper persisted in and was widely used in the marketplace for decades without the contemplation of the present invention or the potential advantages therefrom.

As set forth in this application, the present inventor has discovered that the force needed to expand an expandable slit sheet paper is far greater than the force required to expand an extensible slit sheet paper. By way of example, a 50 pound Kraft paper expandable slit sheet that is 15" wide prior to expansion requires approximately 4-6 pounds or 0.4 pounds per inch, whereas the force required to expand an extensible slit sheet of the same paper weight is 0.15-0.22 pounds per inch. This is a marked difference between the papers. Kraft paper has the strength to provide an acceptable expandable slit sheet. However, unexpectedly, the extensible slit sheet imparts an ease of expansion that greatly reduces the force required to expand the slit sheet, not based on the main purpose for extensible paper which is to increase its tensile strength but, rather, its capability to stretch. Since extensible paper is higher in cost and Kraft paper was strong enough, it was not previously known that extensible paper could be of benefit for making slit paper sheets of the types found in, e.g., U.S. Pat. Nos. 5,538,778, 5,667,871, 5,688,578, and 5,782,735, and U.S. Non-Provisional application Ser. No. 15/428,144. For example, it was not appreciated that an extensible slit sheet could have provided an equivalent strength to light weight, thin papers that previously had no applicability as a wrapping product. Light weight Kraft paper tears more easily than heavier weights of Kraft paper. It has now been found that the extensible paper enables the use of the lighter weight expanded slit-sheet papers that also advantageously provide gentler cushioning required by fragile items when a slit sheet is expanded, in contrast to the more rigid cushioning provided by heavier weight expanded slit-sheet papers.

Reference is particularly made to the graph of Table 1 on page 5 of U. S. Patent Publication No. 2016/0355985 (now U.S. Pat. No. 9,945,077) as if recited in full, that describes paper strength based on certain manufacturing techniques. Within the graph is a column describing elongation at the point of paper break (or tearing of fibers) separated into two sub columns of the machine direction (MD) and cross direction (CD), also referred to as transverse direction. The elongation percentage of Table 1 ranges from 5.3% to 7.1% in the cross direction (CD) and 3.3% to 10.6% in the machine direction (MD).

Reference is also made to U.S. Pat. No. 3,266,972 within Table III of column 5 which references elongation in the percentage range from 3.7% to 4.6% in the CD or cross direction and 9.7% to 11.1% in the machine direction.

In both '985 and '972, the variations are based on the manufacturing process that places an emphasis on tensile strength and stretch in either the cross direction or machine direction accordingly.

The present inventor has discovered that for the purposes of expanding an extensible slit sheet paper for use as a packaging wrap and/or void fill, machine direction extensible ranges from 1%-9% provide an adequate extensibility, with 1% to 6% preferred, and 1% to 4% most highly preferred. The lower the extensibility coincides with lower costs of the paper per square foot. As indicated above, it should be understood that extensibility is measured on unslit paper.

In some alternative embodiments, machine direction extensibility ranges of the extendible slit sheet paper can have ranges of:

a) from 1.5%-9%, or more preferably from 1.5% to 6% preferred, or even more preferably from 1.5% to 4%; or
b) from 2%-9%, or more preferably from 2% to 6% preferred, or even more preferably from 2% to 4%; or
c) from 3%-9%, or more preferably from 3% to 6% preferred, or even more preferably from 3% to 4%.

For the purposes of expanding the slit sheet paper for use as a packaging wrap and/or void fill, it has been found that cross direction extensible ranges from 1%-5% provides an adequate extensibility with 1% to 4% preferred, and 1% to 3% most highly preferred.

In some alternative embodiments, cross direction extensibility ranges of the extendible slit sheet paper can have ranges of: a) from 1.5%-5%, or more preferably from 1.5% to 4%, or even more preferably from 1.5% to 3%; or b) from 2%-5%, or more preferably from 2% to 4%, or even more preferably from 2% to 3%.

In combination with the extensible paper, a smaller, lighter weight, and recyclable version of an expander can be employed (such as, e.g., made entirely or substantially entirely with recyclable cardboard in some illustrative embodiments). This expands the market to customers that use a very small amount of wrap as compared to the industrial market. It also provides for a less expensive expansion device to be employed for expanding the slit paper. Additionally, it enhances the ease of use by the packer by providing for less ripping during the wrapping process that occurs when the tension is not properly set. This occurs as the roll, during its continued use, becomes smaller and lighter in weight. As the roll of expanded slit sheet becomes lighter the tension required increases. Thus, there need for a varying tensioning method. With the use of the extensible paper, the tension required is significantly decreased and the strength of the paper is increased. Both benefit the person wrapping by making the tensioning required much less precise to the point at which, a single tension setting can be used with little or no adjustment. If the tension is set higher than necessary, the increase in strength from the extensible paper keeps the product from tearing and therefore makes it easier for the packer to use. Therefore, the packer can make fewer adjustments as the slit sheet roll becomes smaller and smaller.

The reduction in the force required to expand the slit paper enables a new product to be created using lighter weight papers. In the past, expanded slit sheet paper is primarily used as a wrapping product whereas its use as a void fill would be in limited circumstances due to void fill being typically the cheapest, that is, the lowest cost of all packaging products. The increased strength of the extensible sheet enables the use of a thinner and lighter weight slit sheet paper as a void fill product. If the expanded slit sheet is not being used as a wrap, then the thicker 0.005", 50 pounds per 3,000 square feet paper and above is not required and a lighter weight 0.003-0.0045" thick, 30-40 pounds per 3,000 square feet paper can be used as void fill. It can also be used to provide cushioning that other paper void fill products have not been able to provide. It has now been found that even though the extensible paper has a 10% higher price, the use of a thinner paper provides much more square footage per ton and more than compensates for the increased cost of the extensible paper as compared to Kraft paper.

The use of the slit sheet expanded paper as a void fill is described in U.S. Pat. No. 5,688,578, at column 12, and illustrated in FIGS. 6 and 7. However, in the present invention, a separator sheet is preferably not required as disclosed in co-pending patent application U.S. Ser. No. 14/480,319, PCT/US2014/054615, U.S. Ser. No. 15/001,168, and U.S. Ser. No. 15/820,514, the entire disclosures of which are incorporated herein by reference, as though recited herein in full.

The accompanying figures set forth details in relation to some preferred, and non-limiting, embodiments of the invention.

FIG. 1 is the perspective view of an illustrative expander according to some illustrative embodiments, wherein the expander is employed to expand extensible slitted sheet matter that is wound in a roll and supported on the expander. As shown in FIG. 1, element 108 is a corrugated carton frame that houses and is adhered to corrugated yokes 102 and 109 at sides of the carton. The two yokes 102 and 109 have receiving openings that support opposite ends of a cylindrical paper core 106 that supports a roll 103 of unexpanded slit sheet paper that is wound around the core (i.e., having multiple windings or layers around the core). In some preferred embodiments, an optional roll holder 101 is mounted to one of the yokes (e.g., yoke 102 as shown) and adapted to apply a clamping force against the outer surface of the paper core 106 through the use of the setscrew 104 that passes through the spring 105 and the roll holder 101 into a threaded fixture 107 of the yoke 102 as described in co-pending non-provisional application Ser. No. 15/428,144 of the present inventor. By adjusting the setscrew 104, the clamping force on the core 106 can be adjusted, whereby the tension force applied to the roll 103 upon pulling of the paper from the roll during operation can be adjusted.

Figure 2:
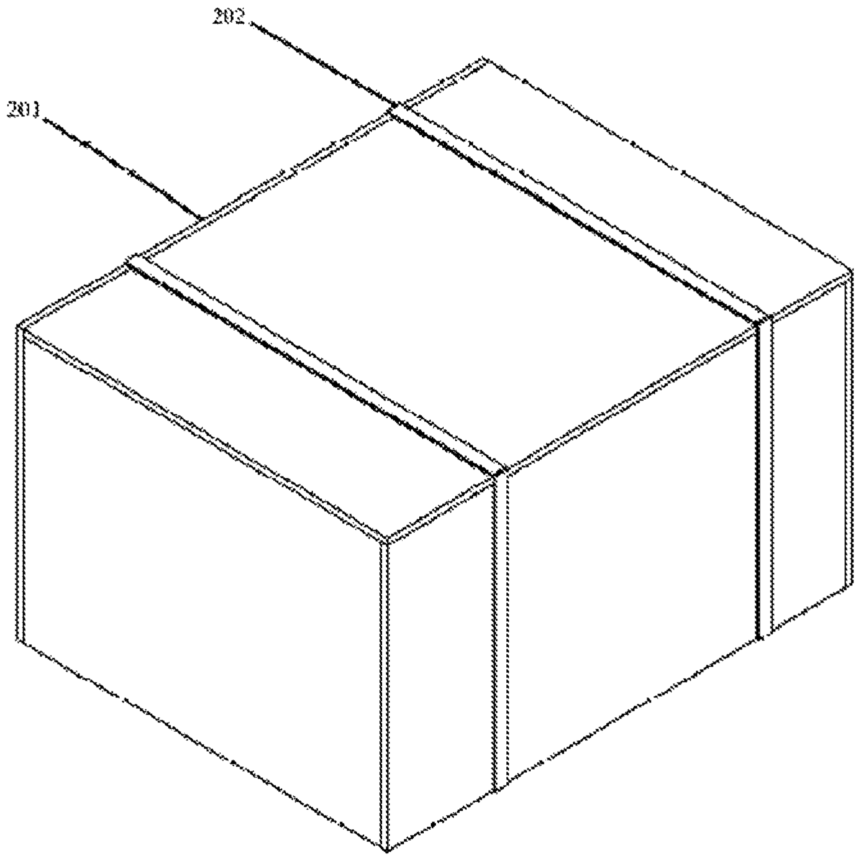
FIG. 2 is a perspective view of the recyclable manual expander in its closed configuration ready to be shipped.

FIG. 2 is perspective view of the expander shown in FIG. 1 in a ready-to-ship configuration including upper corrugated box cover 201 fitted over and hiding the lower corrugated box 108 shown in FIG. 1 that supports the corrugated expansion device. In this illustrative example, straps 202 secure the upper corrugated box 202 to the lower corrugated box.

Figure 3:
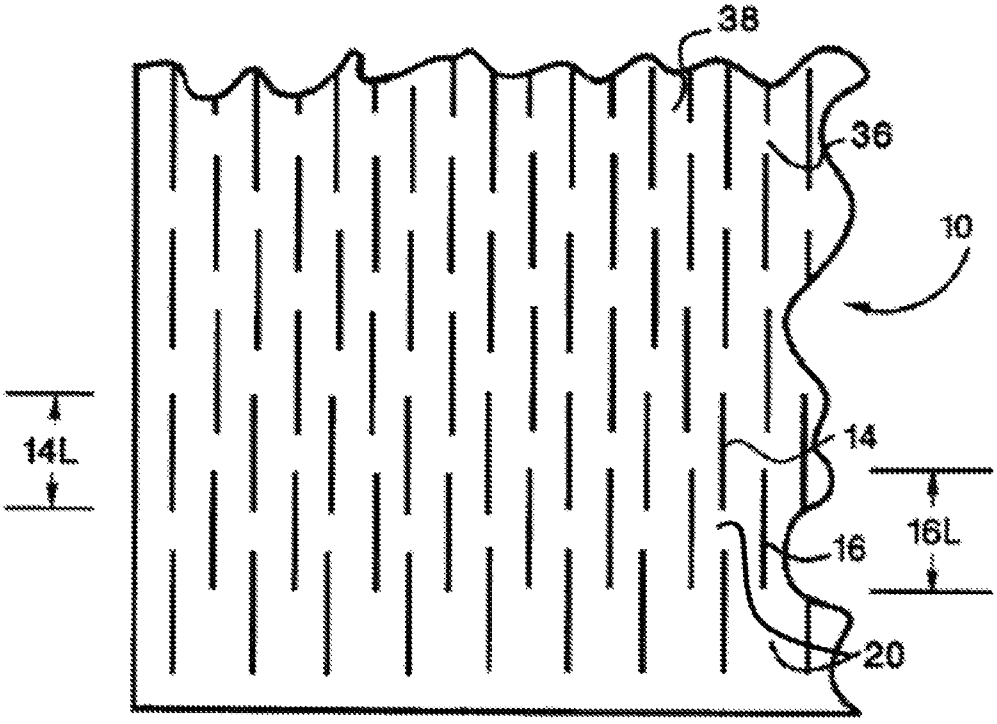
FIG. 3 is a plan view of a section of an illustrative slit paper having a slit pattern that produces an expandable paper in accordance with the present invention.
Figure 4:
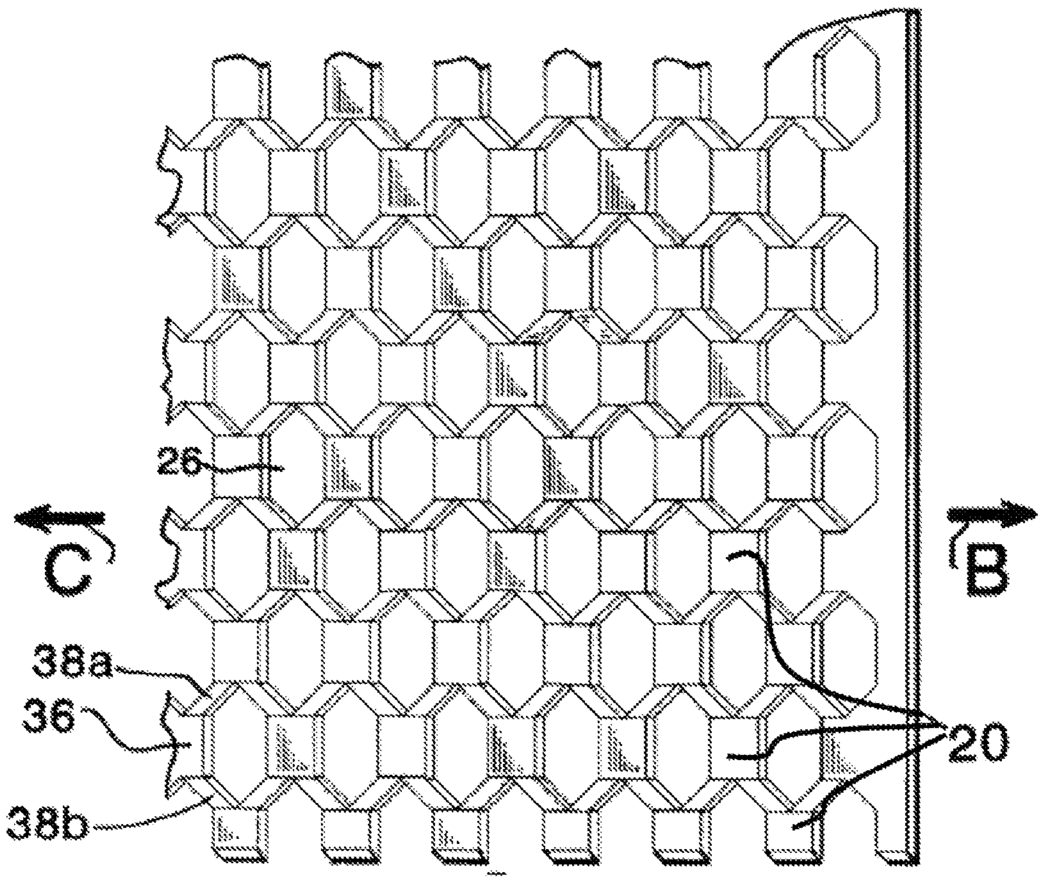
FIG. 4 is a plan view of a section of a slit paper having the slit pattern of FIG. 3 that has been expanded to produce hexagonal cells in accordance with the present invention.

FIG. 3 is an illustration of an exemplary slit pattern in an illustrative expanded slit sheet. In preferred embodiments, the extensible slit sheet paper includes a slit pattern similar to that shown in FIG. 3. The expandable slit sheet paper shown in FIG. 3 operates as an expandable cell-forming paper that can be expanded to an expanded state as shown in FIG. 4 (discussed below). FIG. 3 shows an illustrative section of an expandable slit sheet 10 in an unexpanded (unopened) state, with staggered rows of slits 14 and 16 that extend entirely through the width of the sheet 10, and land portions 20 extending between adjacent slits within rows 14 and 16. As shown in FIG. 3, in the preferred embodiments, the slit lengths 14L and 16L are uniform across the face of the sheet 10; similarly, the distance and area of each row spacing 38 (i.e., between adjacent rows) and each slit spacing 36 (i.e., between adjacent slits) are also uniform. Although an extensible slit sheet can be formed with a variety of slit patterns, the illustrative example shown in FIGS. 3 and 4 depicts an illustrative example to scale with illustrative lengths of slits, spacing between slits, proportional relationships of sizes of created hexagonal cells, land portions and leg portions, etc., according to some illustrative examples with such as drawings being to scale in some illustrative and non-limiting embodiments.

In FIG. 4, the sheet 10 shown in FIG. 3 has been pulled in the direction of arrows B and C and opened to its optimum cell formation. In that regard, the optimum cell formation results in hexagonal shaped cells as shown in FIG. 4. In particular, as depicted, the slits 14 and 16 are in an opened state in which the sheet 10 is oriented to have an array of three-dimensional hexagonal cells 26, with substantially rectangular land portions 20 within the slit spacings 36 situated at an inclined angle (i.e., such as to be transverse to the original plane of the sheet 10), and the leg portions 38*a* and 38*b* connecting the land portions between the row spacings having been warped to, e.g., slightly less than a 90° angle to the original plane of the sheet. The leg portions 38*a* and 38*b* are basically mirror images of one another and connect the land portions 20 such as to form the three dimensional hexagonal cells.

Figure 5:
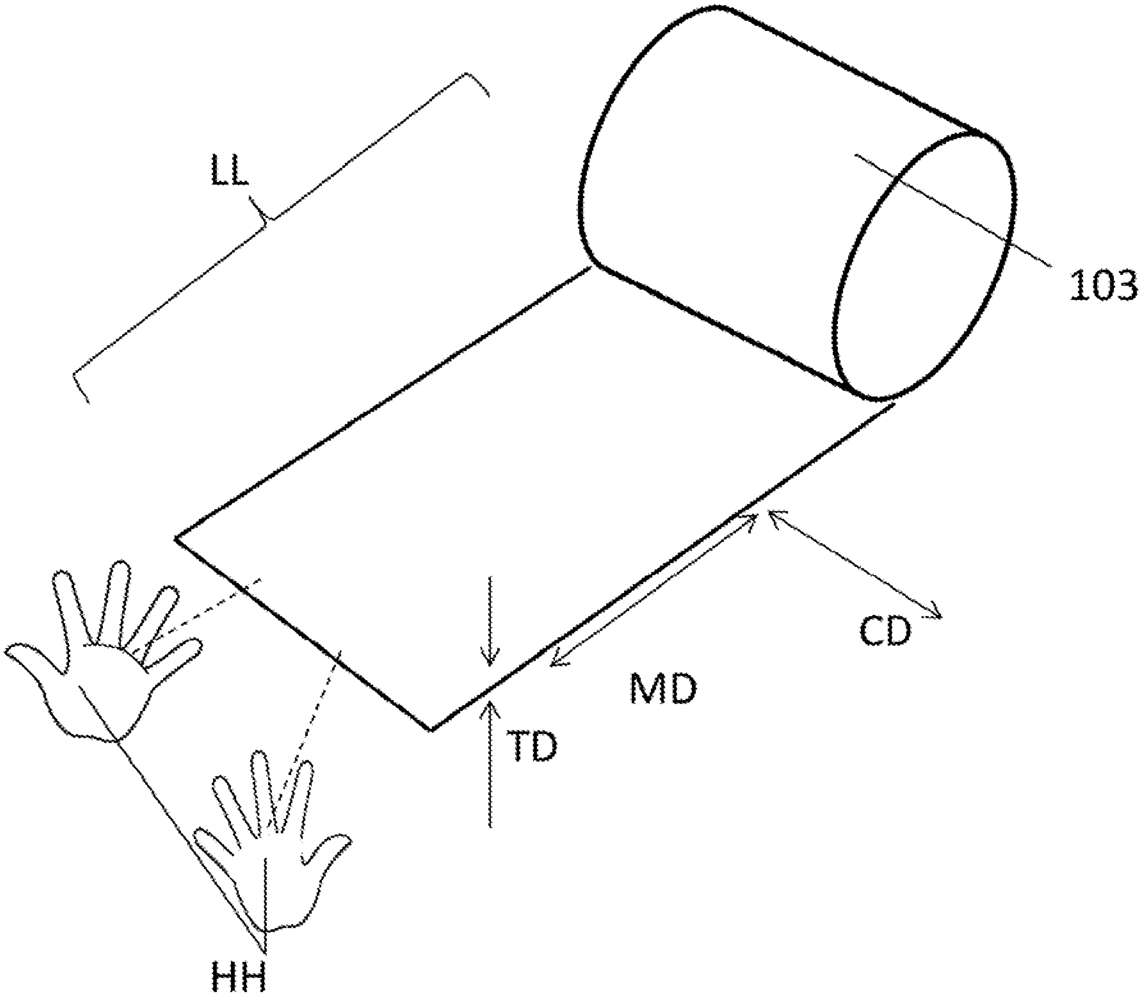
FIG. 5 is an explanatory schematic diagram that illustrates a roll of extensible slit sheet paper, with a length of paper unrolled from the roll according to some illustrative embodiments of the invention.

FIG. 5 is a schematic diagram that illustrates a roll 103 of the extensible slit sheet paper, with a length LL of paper unrolled from the roll 103. In this unrolled state, the extensible slit sheet paper is not in an expanded state unless an expanding force has been applied to the paper. Towards that end, in some preferred embodiments, the expanding force is applied by having an operator grasp a forward end of the length LL with the operator's hands HH and pulling the length LL along the longitudinal direction MD (also referred to herein as the machine direction) which extends parallel to the plane of the extensible slit sheet material. In this manner, in the illustrative embodiment shown in FIG. 5, a force will be applied to the sheet in the direction MD due to the opposing forces of pulling by hand and resistance of rotation at the roll 103. Notably, as indicated above, this resistance of rotation can preferably be adjusted by the operator to a desired force via the setscrew 104 discussed above. With reference to FIG. 5, the machine direction MD is perpendicular to the transverse direction CD (also referred to herein as the cross direction) which extends perpendicular to the longitudinal direction MD along the plane of the extensible slit sheet material. As also shown in FIG. 5, the machine direction MD and the cross direction CD are both perpendicular to the thickness direction TD which extends substantially vertically in the illustrated example shown in FIG. 5.

Figure 6:
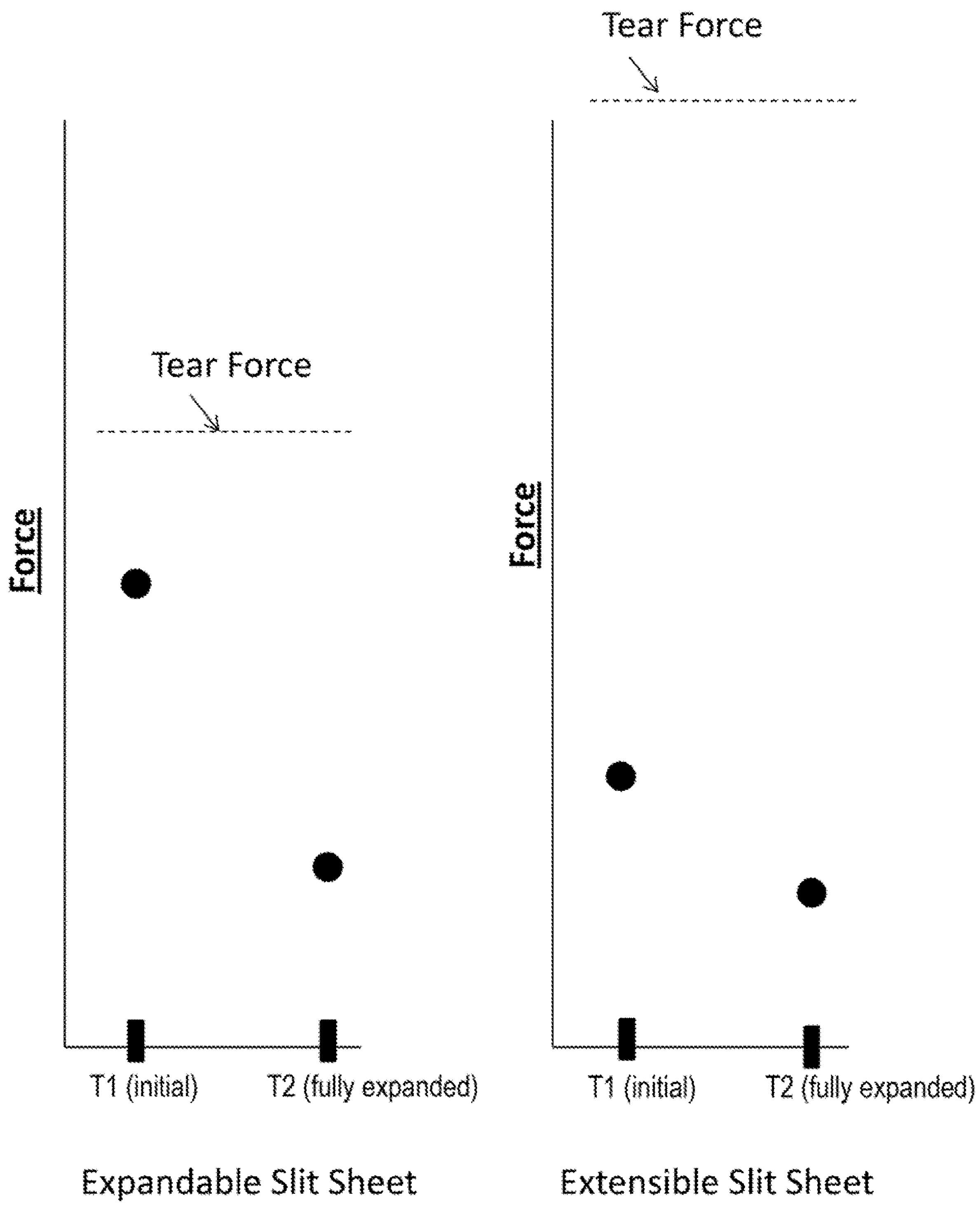
FIG. 6 is a schematic diagram comparing a hypothetical illustrative background expandable slit sheet product with an illustrative and non-limiting exemplary extensible slit sheet product.

FIG. 6 is an explanatory schematic diagram that helps to describe functionality of the present invention according to some preferred embodiments of the invention. This diagram is for explanatory purposes and should not be construed as restricting or otherwise limiting embodiments of the present invention.

Towards this end, FIG. 6 is a schematic diagram comparing a hypothetical illustrative background expandable slit sheet product (see left side) with an illustrative and non-limiting exemplary extensible slit sheet product (see right side). In this figure, it should be appreciated that the force axis values illustrated are not an admission of values in the prior art (i.e., the representation of the expandable slit sheet example is not to scale or proportional and does not suggest or imply any particular values). Similarly, the force axis values illustrated should not be improperly construed as limiting any embodiments of the present invention, as such are depicted for illustrative purposes and not by way of limitation.

FIG. 6 schematically illustrates that with respect to the existing expandable slit sheet paper, the force required to tear the sheet (i.e., Tear Force shown at the left side of the figure) is substantially lower than the force required to tear a sheet (i.e. Tear Force shown at the right side of the figure) of an extensible slit sheet paper according to some illustrative embodiments of the invention. On the other hand, FIG. 6 also schematically illustrates that that with respect to the existing expandable slit sheet paper, the force required to initially begin to expand or open the slits (i.e., T1 at the left side of the figure) is a) substantially closer to the Tear Force required to tear the expandable slit sheet and b) substantially higher than the force required to initially begin to expand or open the slits (i.e., T1 at the right side of the figure) of an extensible slit sheet paper according to some illustrative embodiments of the present invention.

In addition, FIG. 6 also schematically illustrates that after the initial opening of the expandable slit sheet example at the point T1 at the left side of the figure, the continued expansion of the slits to a fully expanded state is at a lower force value in the extendable slit sheet example (i.e., T2 at the left side of the figure). Similarly, in this illustrative example, FIG. 6 also schematically illustrates that after the initial opening of the illustrative extensible slit sheet at the point T1 at the right side of the figure, the continued expansion of the slits to a fully expanded state is at a lower force value in the extensible slit sheet example (i.e., T2 at the right side of the figure). However, FIG. 6 illustrates that the range between the values T1 and T2 of the extensible slit sheet example is substantially narrower than the range between the values T1 and T2 of the extendable slit sheet shown in FIG. 6.

Among other things, FIG. 6 helps to highlight a number of substantial advantages that can be achieved in some illustrative and non-limiting embodiments of the present invention. First, the use of the extensible slit sheet material substantially lowers the Tear Force that leads to failure of the sheet. Among other things, this means that in some embodiments the sheet can be readily expanded manually by a user with less risk of inadvertently tearing the sheet. Second, the use of the extensible slit sheet material substantially lowers the initial force T1 required to initiate opening which renders expansion of the slit sheet material to be substantially facilitated, which, e.g., also facilitates manual expansion. Third, the narrowing of the values between T1 and T2 in the extensible slit sheet example facilitates control and operation by, e.g., requiring a more consistent force during the range of opening of the slits from T1 to T2 in the extensible slit sheet example, which, e.g., also facilitates manual expansion.

Fourth, the increased Tear Force of the extensible slit sheet example also leads to other substantial advantages that facilitate use and operation, such as, e.g., in manual examples. By way of example, the increased Tear Force of the extensible slit sheet example facilitates manual grasping of the paper (e.g., as shown in FIG. 5) with reduced risk of tearing of the sheet in some embodiments (e.g., a user can be more flexible in how the paper is grasped without as substantial worry about causing the paper to tear, such as e.g., grasping with paper with one hand or otherwise varying one's grasp). By way of another example, after the extensible slit sheet paper is fully expanded, there is a lower risk of inadvertently causing the expanded paper to tear by further pulling. As a result, the use of the extensible paper in an extensible slit sheet example can have a number of substantial advantages over prior expanded slit sheet products.

In some illustrative and non-limiting extensible slit sheet embodiments, the force value T1 is substantially closer to the force value T2 such that the force applied throughout expanding of the slits from closed to fully opened hexagons is substantially more consistent during the entire range of expansion. In some illustrative and non-limiting examples, the force T1 is less than 3 times the force T2; in other illustrative embodiments, the force T1 is less than 2 times the force T2; in other illustrative embodiments, the force T1 is less than 1.5 times the force T2; in some other illustrative embodiments, the force T1 is approximately equal to the force T2.

It should also be appreciated that the force T2 represents the force required to reach a fully opened state of the cells in the paper, and that the force from initial opening at T1 to full opening at T2 may vary slightly in some embodiments. In many exemplary embodiments, the force would initially be greatest at T1 and lowest at T2. Thus, the force through the entire opening to achieve full expansion can be maintained within such ratios in some exemplary embodiments. In addition, in some embodiments the force between T1 to T2 (at the end of fully opening) may be lower than T2. However, in some illustrative embodiments the entire breadth of forces (e.g., closeness of values and ratios between maximums and minimums) required from initial opening to achieving full expansion would fall within such ranges described above. It should be understood that these are illustrative embodiments and do not limit other embodiments with different force ratios.

DETAILED DESCRIPTIONS OF TECHNOLOGIES EMPLOYED IN THE PRESENT INVENTION QUOTED FROM DISCLOSURES THAT ARE INCORPORATED BY REFERENCE

The Following are Citations from Clupak's paper patent (U.S. Pat. No. 9,945,077):

Example 1

Heavy-duty Clupak paper having a basis weight of 84.9 g/m2 was made using a gap-former paper-making machine equipped with a Clupak system, at a paper-making speed of 480 m/min and using, as material, 100% unbleached softwood Kraft pulp that had been beaten at high concentration of 28%. The negative draw on the Clupak was set to −4.5%.

Example 2

Heavy-duty Clupak paper was made in the same manner as in Example 1, except that the paper had a basis weight of 76.1 g/m2 and the negative draw on the Clupak was set to −6.0%.

Example 3

Heavy-duty Clupak paper was made in the same manner as in Example 1, except that the paper had a basis weight of 73.4 g/m2 and the negative draw on the Clupak was set to −4.0%.

Example 4

Heavy-duty Clupak paper was made in the same manner as in Example 1, except that the paper had a basis weight of 85.0 g/m2, the negative draw on the Clupak was set to −4.0%, and the pulp blend consisted of 90% unbleached softwood Kraft pulp and 10% unbleached hardwood Kraft pulp.

Comparative Example 1

Heavy-duty Clupak paper was made in the same manner as in Example 1, except that the paper had a basis weight of 71.9 g/m2 and the negative draw on the Clupak was set to −10.0%.

Comparative Example 2

Heavy-duty Clupak paper was made in the same manner as in Example 1, except that the paper had a basis weight of 85.4 g/m2 and the negative draw on the Clupak was set to −1.0%.

Comparative Example 3

Heavy-duty Kraft paper was made in the same manner as in Example 1, except that the paper had a basis weight of 76.0 g/m2 and the Clupak process was not performed.

TABLE 1

| | | Clupak negative draw | Basis weight | Paper thickness | Density | Air resistance | Tensile index Nm/g | | Elongation at break % | | TEA index J/g | | Tensile stiffness index kNm/g | | Tear index mN · m²/g | | Formulation | Breaking after processsed into heavy-duty sack |
|---|---|---|---|---|---|---|---|---|---|---|---|---|---|---|---|---|---|---|
| | | % | g/m² | μm | g/cm³ | sec | MD | CD | MD | CD | MD | CD | MD | CD | MD | CD | | |
| Examples | 1 | −4.5 | 84.9 | 121 | 0.70 | 14 | 88.1 | 31.3 | 7.0 | 7.1 | 3.55 | 1.55 | 5.62 | 3.64 | 12.8 | 28.9 | ○ | ○ |
| | 2 | −6.0 | 76.1 | 118 | 0.65 | 12 | 69.5 | 33.0 | 8.1 | 5.8 | 3.22 | 1.47 | 4.18 | 3.07 | 19.7 | 25.8 | ○ | ○ |
| | 3 | −4.0 | 73.4 | 110 | 0.67 | 13 | 72.5 | 30.1 | 6.0 | 6.0 | 2.60 | 1.17 | 4.95 | 3.43 | 14.9 | 20.3 | ○ | ○ |
| | 4 | −4.0 | 85.0 | 129 | 0.66 | 13 | 83.3 | 39.4 | 7.4 | 6.3 | 3.47 | 1.51 | 5.33 | 3.44 | 13.1 | 25.5 | ◎ | ○ |

TABLE 1-continued

| | | Clupak negative draw | Basis weight | Paper thick-ness | Density | Air resist-ance | Tensile index Nm/g | | Elon-gation at break % | | TEA index J/g | | Tensile stiffness index kNm/g | | Tear index mN · m²/g | | Formu- | Breaking after processsed into heavy- |
|---|---|---|---|---|---|---|---|---|---|---|---|---|---|---|---|---|---|---|
| | | % | g/m² | μm | g/cm³ | sec | MD | CD | MD | CD | MD | CD | MD | CD | MD | CD | lation | duty sack |
| Com-parative Ex-amples | 1 | −10.0 | 71.9 | 112 | 0.64 | 12 | 52.0 | 28.0 | 10.6 | 5.3 | 3.47 | 1.02 | 3.09 | 3.14 | 19.7 | 27.1 | ○ | X |
| | 2 | −1.0 | 85.4 | 130 | 0.66 | 15 | 85.0 | 32.1 | 3.7 | 6.7 | 1.99 | 1.49 | 7.12 | 3.70 | 16.3 | 20.4 | ○ | X |
| | 3 | Not used | 76.0 | 119 | 0.64 | 18 | 92.1 | 35.5 | 3.3 | 5.4 | 1.89 | 1.49 | 8.92 | 3.85 | 19.1 | 24.9 | ○ | ○ |

Evaluation Methods:

(Measurement of Tensile Energy Absorption Index)

Measured by the method specified in JIS P8113: 2006.

(Measurement of Breaking Elongation)

Measured by the method specified in JIS P8113: 2006.

(Measurement of Tear Index)

Measured by the method specified in JIS P8116: 2000.

(Measurement of Burst Index)

Measured by the method specified in JIS P8112: 2008.

(Measurement of Tensile Stiffness Index)

Measured by the method specified in ISO/DIS 1924-3.

(Measurement of Freeness after Disintegration)

Measured by the method specified in JIS P8220: 1998 and JIS P8121: 1995.

Looking at the properties of the Clupak papers in Examples 1 to 4 and Comparative Examples 1 and 2 as well as those of the Kraft paper in Comparative Example 3, as shown in Table 1, the Clupak papers described in Examples 1 to 4 exhibit a good balance of various strengths and elongation and have excellent strength overall; on the other hand, the Clupak papers described in Comparative Examples 1 and 2 and Kraft paper described in Comparative Example 3 exhibit a poor balance of various strengths and elongation and cannot be said to have excellent strength overall.

The following are Citations from "Understanding Sheet Extensibility", R. S. Seth, (Pulp and Paper Research Institute of Canada 3800 Wesbrook Mall Vancouver, BC, Canada V6S 2L9) Pulp & Paper Canada T31, 106:2 (2005) Ill, pages 33-40 (T31-T38):

Tensile strength and extensibility or stretch are two important failure properties of paper. They are defined by the end-point of the sheet's load-elongation curve (FIG. 1). Individually and together, they are important for many product performance properties. For example, TEA, the tensile energy absorbed by the sheet before failure is proportional to the area under the load-elongation curve. Thus, it depends on both the tensile strength and extensibility of the sheet. A high TEA is desired in sack papers [1]. The bursting strength of paper has been shown to be proportional to the product of tensile strength and the square-root of stretch [2]. The fracture toughness of paper has been found to depend strongly on the sheet's tensile strength and stretch [3, 4]. Sheet stretch has also been regarded as important for paper runnability both at the paper machine's dry-end and in the pressroom [5-8]. Papers with high stretch also seem to have a somewhat higher tearing resistance [9], and folding endurance; they are found to be more dimensionally unstable as well [10]. The factors that control sheet tensile strength are fairly well understood [4]. The tensile strength is high if fibres are strong, long, fine and thin-walled. The fibres should be conformable and have a high fibre-fibre bond strength. The sheet tensile strength is also high if fibres are straight, free from deformations and the sheets are well formed. Otherwise, the stress is unevenly distributed when the sheet is strained, leading to premature failure.

This report deals with the factors that control sheet stretch.

Factors that Control Sheet Stretch:

A specimen under tensile load extends more, the longer it is. Therefore, extensibility or stretch or strain at failure as a material property, is expressed as a percentage of the original specimen length (FIG. 1).

Role of Bonding:

Regardless of how bonding between the fibres is increased—by wet pressing, beating or refining, or additives, the sheet stretch of a furnish generally increases with increased fibre-fibre bonding. This is observed for almost all papermaking fibres—chemical, mechanical, wood, non-wood, or recycled. The reasons are as follows. Fibres have a certain "stretch-potential". However, this potential is realized in paper only when fibres form a bonded network. If the bonding is weak, the network fails before the stretch-potential is realized; the sheet stretch is low. As bonding in the network is increased, the stretch-potential of fibres is increasingly realized, the sheet stretch increases. Since increased inter-fibre bonding also increases sheet tensile strength, an increase in stretch with tensile strength is often observed for handsheets (FIG. 2). The stronger the sheet, the more the fibres' stretch-potential is utilized. Because of this relationship between tensile strength and stretch, factors such as sheet grammage or formation that tend to affect tensile strength also affect sheet stretch [11]. A comparison of handsheet stretch values at similar tensile strengths provides a meaningful comparison of the stretch-potential of various furnishes.

The Following are Citations from Trani et al.'s Extensible Paper Patent (U.S. Pat. No. 7,918,966):

Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper web not yet formed and presenting a moisture content of about 35%/45% between two rollers rotating at different speeds. One of these rollers, generally the lower roller, is made of rubber and is rotated at lower speed, while the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper to prepare it for transverse extensibility. By an amount which can reach 10-15%. On the other band the spiral groove contributes to maintaining longitudinal advancement of the processed paper web along the machine.

The Following are Citations from Cabell et al.'s Extensible Paper Web Patent (U.S. Pat. No. 6,458,447):

Tensile and Percent Stretch Test:

The tensile test is used for measuring force versus percent elongation properties. The tests are performed on a Thwing Albert Intellect II-STD Model No. 1451-24PGB, available from the Thwing-Albert Co. of Philadelphia, Pa.

The samples used for this test are 1" wide×6" long with the long axis of the sample cut parallel to the direction of maximum extensibility of the sample. The sample should be cut With a sharp Exacto knife or some suitably sharp cutting device design to cut a precise 1" wide sample. (If there is more than one direction of extensibility of the material, samples should be taken parallel to representative direction of elongation). The sample should be cut so that an area representative of the symmetry of the overall pattern of the deformed region is represented. There will be cases (due to variations in either the size of the deformed portion or the relative geometries of regions 1 and 2) in which it will be necessary to cut either larger or smaller samples than is suggested herein. In this case, it is very important to note (along with any data reported) the size of the sample, which area of the deformed region it was taken from and preferably include a schematic of the representative area used for the sample. Three samples of a given material are tested.

The Following are Citations from Cramer et al.'s Extensible Paper Patent (U.S. Pat. No. 3,266,972):

Test and Characterization Procedures:

The test and characterization procedures employed in measuring various properties reported herein are listed in Table I below. Unless otherwise indicated the code letter numerals indicate standard TAPPI tests.

Elongation T457:

By the expression "extensible papers" is meant a paper having an increased elongation (generally a minimum of about 6%) in the machine direction.

In runs IA and IB of this example, rosin size (0.3% by weight based on the weight of pl up) is added at the beater and the pH is adjusted to 4.5 with alum. The stock, having a consistency of 3.6% is dropped to the beater chest and is then pumped to a second chest, passed through a Jordan and continuously diluted with "white water" at the Fourdrinier headbox to a consistency of 0.3%. Properties measured on the various papers is reported in Table III. Each paper has a basis weight of from 49.4 to 50.3 pounds per ream.

TABLE III

| Property | | IA | 1B | IC | ID |
|---|---|---|---|---|---|
| Tensile (lbs/in.) | MD | 15.6 | 16.0 | 18.2 | 22.4 |
| | CD | 12.6 | 13.0 | 14.3 | 15.4 |
| Elongation (percent) | MD | 10.1 | 11.2 | 9.9 | 9.7 |
| | CD | 3.7 | 4.3 | 4.4 | 4.6 |
| Work-to-break (in.-lbs./in.2) | MD | 1.01 | 1.05 | 1.14 | 1.34 |
| | CD | 0.34 | 0.41 | 0.47 | 0.50 |
| MIT Fold | MD | 380 | 398 | 496 | 1,021 |
| | CD | 106 | 94 | 132 | 167 |
| CSI Abrasion (cycles) | MD | 14 | | 20 | 25 |
| | CD | 7 | | 37 | 64 |

The Following are Citations from Trani et al.'s Multilayer Paper Material Patent (U.S. Pat. No. 8,518,522):

These and other objects which will be apparent from the ensuing description are attained according to the invention by a multilayer papery material comprising at least one first three dimensional structure sheet exhibiting reliefs having maximum sizes which are lower than the width of the original sheet, said reliefs being obtained through localized stretching of said first sheet which has an original degree of extensibility of not less than 5% in all the directions, and at least one second sheet made of papery material coupled to said first structure sheet and defining empty spaces with the reliefs thereof.

As it can be seen from the figures, in the embodiment shown in FIG. 1 the multilayer material of the invention consists of two layers 2, 4 of paper presenting extensibility characteristics of not less than 5% both in a longitudinal and in a transverse direction, and preferably not less than 15%.

The Following are Citations from Trani et al.'s Extensible Paper Material Application (U.S. Application No. 2007/0240841):

Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper Web, not yet formed and presenting a moisture content of about 35%/45%, between two rollers rotating at different speeds. One of these rollers, generally the lower roller, is made of rubber and is rotated at lower speed, While the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper, to prepare it for transverse extensibility, by an amount which can reach 10-15%. On the other hand the spiral groove contributes to maintaining longitudinal advancement of the processed paper web along the machine.

Broad Scope of the Invention

Within this application, the use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

All U.S. and foreign patents, patent applications, patent publications, and all other publications cited in this application are incorporated herein by reference in this application in their entireties as though recited herein in full.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. A void fill slit sheet extensible paper cushioning product, comprising:

a slit sheet extensible paper having a slit pattern including a plurality of slits extending in a cross direction that form open cells upon expansion in a machine direction, wherein extensibility of unslit extensible paper from which said slit sheet extensible paper is made is within a range from 9 to 20% in the machine direction.

2. The void fill slit sheet extensible paper cushioning product of claim 1, wherein the extensibility is within a range from 9.7 to 20% in the machine direction.

3. The slit sheet extensible paper cushioning product of claim 1, wherein the extensibility is within a range from 10.6 to 20% in the machine direction.

4. The slit sheet extensible paper cushioning product of claim 1, wherein the extensibility is within a range from 11.1 to 20% in the machine direction.

5. The slit sheet extensible paper cushioning product of claim 1, wherein the extensibility is within a range from 15 to 20% in the machine direction.

6. The slit sheet extensible paper cushioning product of claim 1, wherein the extensibility is within a range of up to 11.1% in the machine direction.

7. The slit sheet extensible paper cushioning product of claim 1, wherein the extensibility is within a range of up to 15% in the machine direction.

8. The slit sheet extensible paper cushioning product of claim 1, wherein the extensibility is at least 3% in the cross direction.

9. The slit sheet extensible paper cushioning product of claim 8, wherein the extensibility is at least 5% in the cross direction.

10. The slit sheet extensible paper cushioning product of claim 1, wherein said slit sheet paper cushioning product is supported in an expander.

11. The slit sheet extensible paper cushioning product of claim 10, wherein said slit sheet extensible paper is a roll of slit sheet paper supported in said expander.

12. The slit sheet extensible paper cushioning product of claim 11, wherein said expander is a manual expander that supports said roll of slit sheet extensible paper such that an operator can manually grasp and pull an end of said roll of slit sheet paper.

13. The slit sheet extensible paper cushioning product of claim 1, wherein the unslit extensible paper has a weight within a range from about 30 to about 40 pounds per 3,000 sq. ft.

14. The slit sheet extensible paper cushioning product of claim 1, wherein the unslit extensible paper has a weight within a range from about 30 to about 50 pounds per 3,000 sq. ft.

15. The slit sheet extensible paper cushioning product of claim 1, wherein said open cells are substantially hexagonal cells having land portions that are inclined from an original plane of the slit sheet extensible paper and leg portions connecting the land portions.

16. The slit sheet extensible paper cushioning product of claim 15, wherein said extensible paper is an extensible Kraft paper.

17. The slit sheet extensible paper cushioning product of claim 15, wherein said extensible paper is a non-creped extensible paper.

18. The slit sheet extensible paper cushioning product of claim 1, wherein said extensible paper is made extensible by subjecting a moist paper web to compressive compaction in the machine direction that compresses fibers together, and said extensible slit sheet paper is made by forming a slit pattern within said unslit extensible paper including a plurality of parallel rows of slits extending in a cross direction that form substantially three-dimensional hexagonal open cells upon expansion in a machine direction.

19. The slit sheet extensible paper cushioning product of claim 18, wherein said compressive compaction including passing the paper web between a roller and an endless blanket.

20. A shipping package, comprising:

a shipping container adapted to receive an object to be cushioned, said object being cushioned by an expanded length of a void fill slit sheet extensible paper, wherein:

the void fill slit sheet extensible paper comprises a slit pattern including a plurality of slits extending in a cross direction that form open cells upon expansion in a machine direction, and extensibility of unslit extensible paper from which the void fill slit sheet extensible paper is made is within a range from 9 to 20% in the machine direction.

21. The shipping package of claim 20, wherein the extensibility is within a range from 9.7 to 20% in the machine direction.

22. The shipping package of claim 20, wherein the unslit extensible paper has a weight within a range from about 30 to about 50 pounds per 3,000 sq. ft.

23. The shipping package of claim 20, wherein the extensibility is within a range from 9 to 15% in the machine direction.

24. The shipping package of claim 20, wherein the extensibility is within a range from 5 to 15% in the cross direction.

25. The shipping package of claim 20, wherein the extensibility is within a range from 10.6 to 20% in the machine direction.

26. The shipping package of claim 20, wherein the extensibility is within a range from 11.1 to 20% in the machine direction.

27. The shipping package of claim 20, wherein the extensibility is within a range of up to 11.1% in the machine direction.

28. The shipping package of claim 20, wherein the extensibility is within a range of up to 15% in the machine direction.

* * * * *